Figure 1:
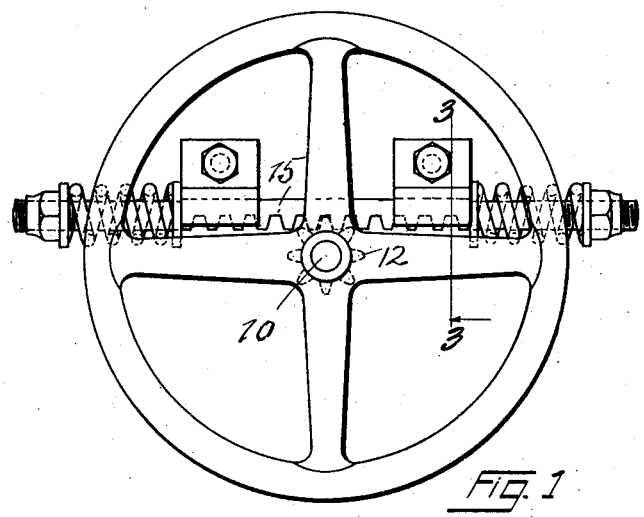

A. F. GREINER.
STEERING GEAR ATTACHMENT.
APPLICATION FILED JULY 2, 1920.

1,391,053.

Patented Sept. 20, 1921.

INVENTOR
Anton F. Greiner
BY
Thurston Kwis Hudson
ATTORNEYS.

UNITED STATES PATENT OFFICE.

ANTON F. GREINER, OF CLEVELAND, OHIO, ASSIGNOR TO THE CLEVELAND TRACTOR COMPANY, OF EUCLID, OHIO, A CORPORATION OF OHIO.

STEERING-GEAR ATTACHMENT.

1,391,053.  Specification of Letters Patent.  Patented Sept. 20, 1921.

Application filed July 2, 1920. Serial No. 393,582.

*To all whom it may concern:*

Be it known that I, ANTON F. GREINER, a citizen of Germany, residing at Cleveland, in the county of Cuyahoga and State of Ohio, have invented a certain new and useful Improvement in Steering-Gear Attachments, of which the following is a full, clear, and exact description.

This invention is an attachment for use with the ordinary steering post of a motor vehicle for the purpose of yieldingly holding said post in and of inducing its return to the central position which it occupies when the steering wheels are in the position to cause the straight ahead travel of the vehicle.

The object of the invention is to provide such an attachment in an easily applied and comparatively cheap but exceeding efficient form.

The invention consists in the construction and combination of parts shown in the drawing, hereinafter described and pointed out definitely in the appended claims.

Figure 2:
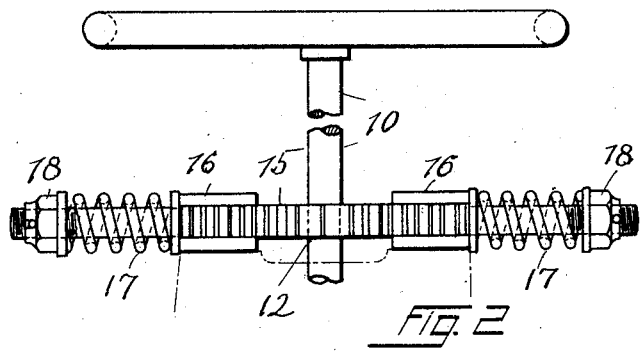
Figure 3:
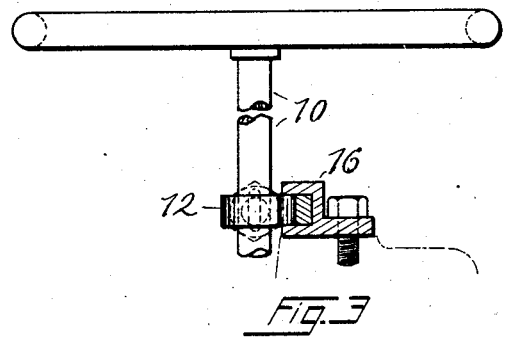

In the drawings, Figure 1 is a plan view showing the invention applied to the steering post of a motor vehicle. Fig. 2 is a front elevation, and Fig. 3 is a side elevation of said invention.

Referring to the parts by reference characters, 10 represents the rotatable steering post of a motor vehicle. Attached to it at a convenient point, preferably near its lower end, is a gear 12. A rack bar 15 is slidably mounted in two brackets 16 which may be attached to any suitable fixture, such for example, as the transmission gear case (indicated by dotted lines in Figs. 2 and 3), and in such position that it always holds the rack bar in engagement with the gear 12.

The rack bar projects at both ends beyond the brackets, and each of these projecting ends is surrounded by a compressed coil spring 17 which thrusts against the adjacent bracket and against a thrust collar which is adjustably secured to the end of said rack bar. The ends of the rack bar are threaded and on each a nut 18 is screwed and serves as the thrust collar for engagement with the end of a spring 17. As these nuts are screwed on or off the tension of the springs will be varied, and so regulated that the two springs will be in balance when the rack bar is in the position it must occupy, when the steering post is in that position which it must occupy, when the steering wheels are set to steer the vehicle in a straight path.

Having described my invention, I claim:—

1. The combination with the rotatable steering post of a motor vehicle, of a gear secured thereto, a rack bar mounted to slide endwise in engagement with said gear, and opposed springs acting on said rack bar to move it endwise and return it to the position in which the springs balance each other.

2. The combination with the rotatable steering post of a motor vehicle, of a gear fixed thereto, two guide brackets fixed on opposite sides of said steering post, a rack bar slidably mounted in said brackets in engagement with said gear, a thrust collar adjustably secured to each end of said rack bar, and balanced coil springs surrounding the rack bar and compressed between said brackets and thrust collars.

3. The combination with a steering post of a motor vehicle, of a gear secured thereto, a rack bar mounted to slide endwise in engagement with said gear, and an elastic mechanism acting on said rack bar adapted to flexibly resist the steering effort used on said post and to return said post to a straight ahead position when the steering effort is released.

In testimony whereof, I hereunto affix my signature.

ANTON F. GREINER.